Oct. 20, 1964  C. E. SMITH ETAL  3,153,459
ELECTRICAL SYSTEMS
Filed May 15, 1961
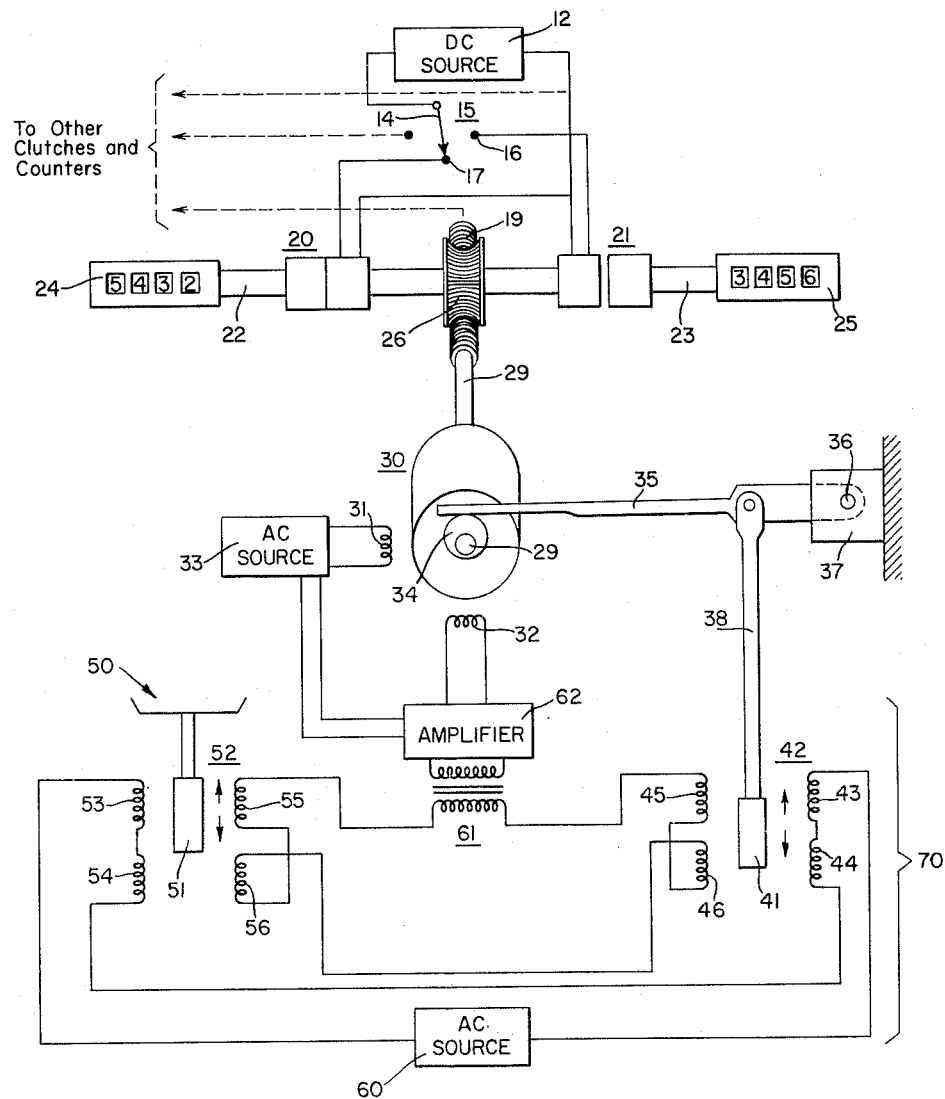
INVENTORS.
CLAYTON E. SMITH
ALAN G. KENDALL
BY
Nelson E. Kimmelman
ATTORNEY

3,153,459
ELECTRICAL SYSTEMS
Clayton E. Smith and Alan G. Kendall, Rutland, Vt., assignors to Howe Richardson Scale Company, a corporation of Delaware
Filed May 15, 1961, Ser. No. 109,897
8 Claims. (Cl. 177—15)

This invention relates to a measurement system and in particular to a system for weighing a number of different materials in succession and obtaining indications of the weights of each material weighed.

There is often need for a system for weighing different materials in turn and obtaining the individual weights of each material without nesessarily removing the material previously weighed from the weighing mechanism. For example, industry has a need for such a system for taking inventory of certain classes of items which may be too small or too numerous to count by hand. Since the weight of each item in the class is known, the total of the items in that class can be ascertained by obtaining the total weight of the items.

Is is therefore a prime object of the invention to provide an automatic system for weighing different classes of materials in succession.

Another object of the invention is to provide an electro-mechanical system for inexpensively and efficiently ascertaining and recording the weights of various classes of materials weighed in succession.

Still another object of the invention is to provide a novel and inexpensive system for obtaining the individual summated weights of various classes of items whether or not the items are removed from the weighing mechanism after they are weighed.

Other object of the invention will be apparent from a perusal of the specification and claims herein taken in connection with the sole figure herein.

The sole figure is a schematic representation of the novel system according to our invention.

In accordance with our invention we provide a plurality of electro-magnetic clutches each of which has associated therewith a counter. Switching means are provided for energizing any one of said clutch-counter combinations. A weighing device, is provided which is coupled to a servo-system that has an element adapted to move to balance the effect of items being weighed by the weighing device. Coupled to the servo-system is a servo-motor which, when energized, drives the balancing element in the servo system. When a selected clutch is engaged and a material is placed on the weighing device, the servo motor drives the balance element and simultaneously drives the selected clutch-counter combination. When the servo system is again balanced the servo motor stops and the weight of the material weighed can be read from the selected counter.

In the sole figure, one terminal of a D.C. source 12 is connected to the movable arm 14 of a switch 15 which has contacts 16, 17 and 18. The contacts 16, 17 and 18 constitute input terminals of electro-magnetic clutches 21, 20 and others as desired. These clutches may be, for example, Model T 505 magnetic clutches sold by the Sterling Precision Corporation. The other terminal of the source 12 is connected to the respective other terminals of the electro-magnetic clutches 20 and 21. The clutches 20 and 21 are coupled by shafts 22 and 23 respectively to counters 24 and 25 which may be of the simple mechanical type such as Veeder-Root counter Model A 113335. Each of the electro-magnetic clutches 20, and 21 are coupled by appropriate means such as worm 19 and gear 26 to the shaft 29 of a servo-motor 30 having quadrature windings 31 and 32 such as Model RBC-2407 sold by the Holtzer-Cabot Company. An A.C. source 33 energizes the winding 31. To the shaft 29 there is fixedly mounted an eccentric cam 34 which co-acts with a cam follower arm 35 that pivots about a pivot point 36 journaled in a bracket represented schematically at 37. Pivotally coupled to the arm 35 is a link member 38 which is connected to the armature 41 of a differential transformer 42 having series-aiding windings 43 and 44 and series-opposing windings 45 and 46. These differential transformers may be of the type shown in United States Patent No. 2,568,587 issued to W. Macgeorge on Sept. 18, 1951. Materials to be weighed in succession are applied to a weighing mechanism generally indicated by the numeral 50. This weighing system is portrayed merely schematically because it can take any number of desired forms. Lever-counter poise or other purely mechanical systems or electro-mechanical systems employing hydraulic load cells and Bourdon tubes are exemplary of the types of systems that can be used, although any other system for causing displacement in response to weight is equally adaptable. Coupled to the weighing system 50 is another armature 51 adapted to move up and down in the center of a second differential transformer 52. The transformer 52 has windings 53, 54, 55, and 56 which may be substantially identical to the windings 43, 44, 45 and 46.

The primary windings 43, 44, 53 and 54 are energized by an A.C. source 60 whereas the secondary windings 45, 46, 55 and 56 are energized by virtue of the electro-magnetic coupling between the respective primary and secondary windings of the differential transformers 42 and 52, the amplitude and polarity of the voltages induced in the secondary windings being a function of the positions of the armatures 51 and 41 therein. Voltages derived from the secondary windings are applied via the transformer 61 as an error signal to the servo-amplifier 62. The amplifier 62 may be Model 6251 Servo Amplifier sold by Automatic Timing and Controls, Inc. The servomechanism including arms 35, and 38 and the motor and differential transformer assemblies may be Model 6171 sold by Automatic Timing and Controls, Inc.

The operation of the system is as follows. An operator desires to weigh a number of items within a first class of goods. Accordingly, the operator turns the arm 14 of switch 15 to touch contact 17 which thereupon applies a D.C. voltage from the source 12 to the electro-magnetic clutch 20. This causes the clutch 20 to engage thereby coupling the counter 24 via the shaft 22 and the clutch to the motor 30. As stated above, the servo-system 70 is so constructed that it is balanced and does not produce any error signal in the absence of any material being applied to the weighing system 50. When the system 70 is balanced, the motor 30 does not function. On the application of the items of the first class to the device 50, the armature 51 is displaced vertically causing a variation in the voltage coupled to the secondary windings 55 and 56 and hence will produce an error signal at the transformer 61. As a result, the amplifier 62 will produce an amplified signal at the winding 32 of the motor 30 which causes the motor 30 to commence rotation in a direction and to an extent corresponding to the amplitude and polarity of the error signal across winding 32. As the shaft 29 rotates, the eccentric cam 34 causes the cam follower arm 35 to be lowered thereby causing the linkage arm 38 to be moved downwards also until the change in the coupling of the A.C. signal (from the source 60) from the primary windings 43, 44 to the secondary windings 45, 46 exactly equals the corresponding signal induced in the secondary windings 55 and 56 whereupon there will be no error signal applied to the amplifier 62 and the motor 30 will stop. Since the clutch 20 was engaged when the arm 14 touched the contact 17, the activation of the motor 30 upon the application of items to the device 50 simultaneously causes the counter 25 to begin to register the weight of the items in the first class and to stop when the servo system is again balanced.

If the operator then desires to obtain the weight of the items in a second glass which are next to be weighed, he will move the arm 14 to touch the contact 16 thereby deenergizing clutch 20 and energizing clutch 21. When the items in the second class are then applied to the device 50, the vertical movement of the armature 51 again produces an imbalance in the system 70 causing the amplifier 62 to produce an amplified error signal through winding 32 which again causes the motor 30 to rotate until the armature 41 is moved to balance the system again whereupon the motor 30 stops and the weight of the items in the second class is shown in the counter 25. As many other clutch-counter combinations may be added as desired depending upon the number of classes of items whose individual summated weights are to be obtained. Of course, the successive material applied to the device 50 need not be removed before the next class of items is to be weighed since the servo-system 70 can balance at any desired point within the travel-range of the armatures 51 and 41.

We claim:

1. Weighing apparatus for obtaining the individual summated weights of a plurality of materials comprising a weighing system having a member that is displaced proportionately to a quantity of material being weighed, a plurality of separate indicators one corresponding to each of said materials, an electrical motor, means for selectively connecting any one of said indicators to be driven from said motor during the entire period that the corresponding material is being weighed, all of said other indicators being disconnected from drive by said motor during said period, means responsive continuously to displacement of said member producing a proportional electrical signal and applying said signal during said entire period to actuate said motor for driving the indicator connected thereto, and means driven by the motor during said period for producing and applying a varying counteracting signal sufficient to arrest said motor whereby the reading of the driven indicator is indicative of the individual weight of said quantity of material.

2. Weighing apparatus for obtaining the individual summated weights of a plurality of materials comprising a weighing system having a member that is displaced proportionately to a quantity of material being weighed, a plurality of separate indicators one corresponding to each material, an electrical motor, means for selectively driving any one of said indicators from said motor comprising an individual electromagnetic clutch coupled between the motor and each indicator, means for selectively energizing any one of said clutches to drive connect the motor to a selected one of said indicators corresponding to the material being weighed during the entire period that said corresponding material is being weighed, means responsive to displacement of said member for producing a proportional electrical signal during the entire period said corresponding material is being weighed and applying it to actuate said motor for driving the indicator clutched thereto during said entire period, and means driven by the motor for counteracting said signal to arrest said motor.

3. Weighing apparatus for obtaining the individual summated weights of a plurality of materials comprising a weighing system having a member that is displaced proportionately to a quantity of material being weighed, a plurality of separate indicators one corresponding to each material to be weighed, an electrical motor having a control circuit that is normally balanced, means for selectively driving any one of said indicators from said motor comprising an individual electromagnetic clutch coupled between the motor and each indicator, switch means for selectively energizing any one of said clutches to drive connect the motor to a selected indicator corresponding to the material being weighed, means producing an electrical signal responsive to displacement of said member and applying it during the entire period said corresponding material is being weighed to said motor circuit to unbalance said circuit sufficiently to actuate the motor for driving the indicator clutched thereto during said period, and means driven by the motor for producing a changing counteracting signal and applying it to said circuit to arrest said motor when the circuit is rebalanced.

4. In the weighing apparatus defined in claim 3, means actuating said switching means to deenergize said one clutch and energize another clutch to drive connect another of said indicators to said motor after said circuit has rebalanced and before another material is introduced to said weighing system, said member being further displaced upon introduction of said other material to said weighing system to produce and apply a further motor energizing signal to said circuit, and said motor when further energized producing and applying a further counteracting signal to said motor circuit to again rebalance said circuit and arrest the motor, whereby said other indicator gives an indication of the weight of said other material.

5. Weighing apparatus for obtaining the individual summated weights of a plurality of materials comprising a weighing device having a member that is incrementally displaced proportionately to successive added materials in said device, a plurality of separate indicators one corresponding to each of said materials, a normally balanced servo motor, means for selectively driving any one of said indicators from said motor comprising an individual clutch coupled between said motor and each indicator, means for selectively operating any one of said clutches to drive connect the motor to the associated indicator during the period the corresponding material is being weighed, means for producing electrical signals proportional to incremental displacements of said member when successive materials are added into said device and for applying said signals to actuate said motor driving the indicator then clutched thereto during the entire period the corresponding material is being weighed, and means driven by the motor for producing successive counteracting signals and applying them to arrest said motor, said selective operating means being actuatable to disconnect said motor from said one indicator and drive connect it to another indicator when said motor has been arrested by a counteracting signal, whereby the respective indicator readings correspond to the individual weights of the successively added materials.

6. Weighing apparatus comprising a weighing system having a member that is incrementally displaced proportionately to successive quantities of different materials being weighed, a plurality of separate indicators one corresponding to each of said materials, a servo motor having a normally balanced control circuit, means for driving any one of said indicators from said motor comprising an individual electromagnetic clutch coupled between the motor and each indicator, switch means for selectively energizing any one of said clutches to drive connect the motor to the associated indicator, a first adjustable differential transformer coupled to said member for producing an electrical signal proportional to displacement of said member when a first material is being weighed and applying said signal to said motor circuit for driving the indicator clutched thereto during the entire period the corresponding material is being weighed, and means comprising a second adjustable differential transformer driven by the motor for producing a proportional counteracting electrical signal and applying it to said motor circuit to arrest said motor, whereby the reading of said one indicator is indicative of the weight of the first material, said switch means being operable each time the motor is so arrested to disconnect said one clutch and energize another of said clutches corresponding to a different material, whereby when said different material is weighed the servo motor cycle is repeated to proportionately operate said other indicator which indicates the weight of the different material.

7. Weighing apparatus comprising a weighing device adapted to cumulatively receive successive quantities of different materials, a plurality of indicators one corresponding to each of said materials, a self-balancing servo system operatively connected to said device and embodying mechanism that is displaced a predetermined amount proportionately corresponding to each individual added quantity, and means for selectively connecting said mechanism to drive a different one of said indicators before each said quantity of different material has been added to said device whereby each said indicator is operated during the entire period of weighing of the corresponding material to indicate the individual weight of said added quantity of corresponding material.

8. In the weighing apparatus defined in claim 7, said mechanism comprising a servo motor having a control circuit, and said system comprising opposed differential transformers actuated respectively by said device and said motor and operatively connected into said control circuit.

References Cited in the file of this patent

UNITED STATES PATENTS

| | | |
|---|---|---|
| 2,055,730 | Rees | Sept. 29, 1936 |
| 2,420,539 | Hornfeck | May 13, 1947 |
| 2,610,052 | Macgeorge | Sept. 9, 1952 |
| 2,871,005 | Bourassa | Jan. 27, 1959 |
| 2,873,107 | Lyons | Feb. 10, 1959 |
| 2,918,270 | Golding | Dec. 22, 1959 |
| 2,932,501 | Hicks | Apr. 12, 1960 |
| 2,990,116 | Quinn et al. | June 27, 1961 |